(12) United States Patent
Matsuura et al.

(10) Patent No.: US 6,991,821 B2
(45) Date of Patent: Jan. 31, 2006

(54) METHOD FOR PRODUCING PACKED TOFU

(75) Inventors: Masaru Matsuura, Chiba (JP); Tomoko Takeuchi, Chiba (JP); Shigeru Noguchi, Chiba (JP); Jun Sasaki, Chiba (JP); Jun Yamanishi, Chiba (JP)

(73) Assignee: Kikkoman Corporation, Chiba (JP)

( * ) Notice: Subject to any disclaimer, the term of this patent is extended or adjusted under 35 U.S.C. 154(b) by 164 days.

(21) Appl. No.: 10/025,570

(22) Filed: Dec. 26, 2001

(65) Prior Publication Data
US 2002/0122855 A1 Sep. 5, 2002

(30) Foreign Application Priority Data
Dec. 26, 2000 (JP) .............................. 2000-394416
Mar. 19, 2001 (JP) .............................. 2001-077555

(51) Int. Cl.
*B65B 3/00* (2006.01)
*A23L 1/20* (2006.01)

(52) U.S. Cl. ...................... 426/392; 426/405; 426/407; 426/389; 426/512; 426/634

(58) Field of Classification Search ................ 426/392, 426/394, 405, 407, 634, 573, 656, 389, 512
See application file for complete search history.

(56) References Cited

U.S. PATENT DOCUMENTS

| | | | | |
|---|---|---|---|---|
| 3,812,270 A | * | 5/1974 | Hartz ........................ 426/231 |
| 4,147,811 A | * | 4/1979 | Abe ........................... 426/634 |
| 4,514,433 A | * | 4/1985 | Matsuura .................... 426/634 |
| 4,664,930 A | * | 5/1987 | Moriya ....................... 426/573 |
| 4,874,630 A | * | 10/1989 | Sengoku et al. ............ 426/634 |
| 5,190,787 A | * | 3/1993 | Takeoka et al. ............ 426/634 |
| 5,363,753 A | * | 11/1994 | Ueda et al. .................. 99/453 |
| 6,042,851 A | * | 3/2000 | Matsuura et al. .............. 426/8 |
| 6,120,830 A | * | 9/2000 | Matsuura et al. ........... 426/573 |

FOREIGN PATENT DOCUMENTS

| | | | |
|---|---|---|---|
| EP | 124060 A1 | * | 11/1984 |
| JP | 58071860 A | * | 4/1983 |
| JP | 59175857 A | * | 10/1984 |
| JP | 60110260 A | * | 6/1985 |
| JP | 61104980 A | * | 5/1986 |
| JP | 61234763 A | * | 10/1986 |
| JP | 61282048 A | * | 12/1986 |
| JP | 63233758 A | * | 9/1988 |
| JP | 03195467 A | * | 8/1991 |
| JP | 2936175 | | 6/1999 |

* cited by examiner

*Primary Examiner*—Milton I. Cano
*Assistant Examiner*—Robert Madsen
(74) *Attorney, Agent, or Firm*—Young & Thompson

(57) ABSTRACT

A method of producing packed tofu that is easily released from the container, in which an aqueous ethanol solution or an aqueous solution of a magnesium salt and/or a calcium salt is previously applied to the inside of the container to be filled with soybean milk, or impact is given to a sealed container having tofu packed therein.

15 Claims, 16 Drawing Sheets

METHOD FOR PRODUCING PACKED TOFU

BACKGROUND OF THE INVENTION

1. Field of the Invention

The present invention relates to a method for producing packed tofu (bean curd) which is easily released from the container without leaving a residue in the container.

2. Description of the Related Art

Tofu is roughly divided according to the process of preparation into (1) cut tofu which is obtained by coagulating soybean milk in a mold, cut to size, and kept in water, and (2) packed tofu which is obtained by filling a small container of given size with soybean milk containing a coagulant, sealing the container, and allowing the soybean milk to coagulate in the sealed container. Nowadays packed tofu predominates over cut tofu from the standpoint of shelf life, convenience of distribution, and so forth.

Since packed tofu is made by coagulation of soybean milk as packaged in a container, it has a disadvantage that tofu is in tight contact with the container. Simply turning the container upside down is not able to release tofu from the container in its perfect shape without leaving part of tofu stuck to the container. Various manipulations have been taken to solve this problem. Typical manipulations include using an increased amount of a coagulant, setting the coagulation temperature higher than usual, or heating for a longer time than usual to cause strong coagulation thereby to separate some water content to make a water layer between tofu and the container. Although these methods are successful in facilitating removal of tofu from the container, use of a coagulant more than necessary or the raised coagulation temperature deteriorates the taste or texture of tofu.

There is a method comprising preheating soybean milk before addition of a coagulant at 18 to 30° C. to make water separate on coagulation (Japanese Patent 2936175). However, water separation by this method results from impairment of the water retentive properties inherently possessed by tofu, and the whole tofu structure appears to be loose. Therefore, the texture cannot be necessarily seen as elastic as naturally expected of tofu.

SUMMARY OF THE INVENTION

An object of the present invention is to provide a method of producing packed tofu, the method making packed tofu easily and completely releasable from the container without impairing taste and texture of tofu.

The inventors of the present invention have conducted extensive studies and, as a result, found that the above object is accomplished by previously applying an aqueous ethanol solution or an aqueous solution of a magnesium salt or a calcium salt to the inside of a container to be filled with soybean milk or by giving impact from the outside of the container to a sealed container having tofu packed therein.

The present invention provides a method of producing packed tofu comprising applying an aqueous ethanol solution or an aqueous solution containing a magnesium salt and/or a calcium salt to the inside of a container, filling the container with soybean milk, sealing the container, and heating the sealed container to coagulate the soybean milk. The method can further comprise giving impact from the outside of the container to the sealed container having tofu therein.

The present invention also provides a method of producing packed tofu which comprises filling a container with soybean milk, sealing the container, heating the sealed container to coagulate the soybean milk, and dropping the sealed container.

The present invention further provides an apparatus for dropping a package of packed tofu, which comprises a dropping section composed of a transfer plate which is to be loaded with packed tofu and a driving unit for rotating the transfer plate and a receiving section composed of a receiving unit which receives fallen packed tofu and an unloading unit which sends packed tofu to the subsequent step.

According to the method of the invention which uses a treated container, the resulting packed tofu is smoothly released from the container. This is probably because soybean milk forms a thin film due to protein denaturation on contact with ethanol, a magnesium salt or a calcium salt applied to the inside of the container, and the film serves for slippage of tofu on the inner wall of the container. The above effect is further enhanced by giving impact to packed tofu from the outside of the container.

BRIEF DESCRIPTION OF THE DRAWINGS

The present invention will be more particularly described with reference to the accompanying drawings, in which.

DETAILED DESCRIPTION OF THE PREFERRED EMBODIMENTS

Figure 1:
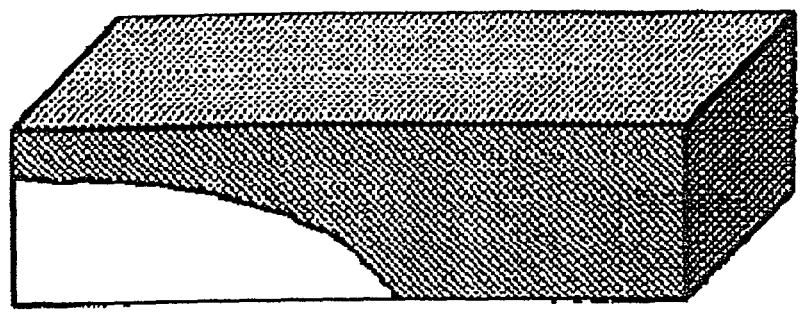
FIG. 1 shows tofu taken out of containers 1 to 3 used in Experiment A, in which the gray zone is the portion remaining in the container.

The method of the present invention which uses a container having an aqueous ethanol solution applied to the inside thereof is described first. This method is carried out similarly to a general process of manufacturing packed tofu except that the container to be filled with soybean milk has an aqueous ethanol solution applied to the inner surface thereof.

Soybean milk used as a starting material is prepared in a conventional manner. That is, soaked soybeans, skinned soybeans or unsoaked soybeans are ground together with water, and the resulting slurry is heated at 80 to 120° C. for about 0.1 to 10 minutes, followed by filtration to obtain soybean milk. If necessary, the soybean milk can be sterilized by high temperature heat treatment. The protein concentration of soybean milk used in this method is preferably 5 to 10% by weight, still preferably 6 to 8% by weight.

Coagulants which can be used in the present invention are conventional and include natural bittern (nigari), magnesium chloride, magnesium sulfate, calcium chloride, calcium sulfate, calcium primary phosphate, calcium lactate, and glucono-δ-lactone. The coagulant is used as dissolved in water in a concentration of 5 to 70% by weight.

The soybean milk containing the coagulant is packed and sealed into a container previously having an aqueous ethanol solution applied to the inside thereof. The container itself is conventional. For example, an open-top box having a capacity of about 100 to 500 ml made of polypropylene (PP), polyethylene (PE), polystyrene (PS), or a PP/PE mixed resin, PS laminated with a release-improving film, e.g., a PP film, or PE laminated with a PP film is used.

The aqueous ethanol solution to be applied preferably has an ethanol concentration of 0.5% or more, particularly 1.0 to 50%, by weight. The manner of applying the aqueous ethanol solution is not restricted as long as the ethanol solution is applied thin and uniformly to the inside, i.e., the bottom and the sides, of the container. For example, the inside of the container is swabbed with a cloth, e.g., gauze, impregnated with the solution, or the solution is sprayed onto the inside of the container.

The container having the aqueous ethanol solution on the inside thereof is filled with soybean milk containing the coagulant and sealed with a sealing cover. The sealed soybean milk is then coagulated by heating at 70 to 130° C. There is thus obtained a package of packed tofu 5 shown in FIG. 15, i.e., tofu 4 packed into a container 3 (a container 1 and a sealing cover 2). The tofu thus prepared can be taken out of the container easily. The releasability of tofu from the container can further be improved by giving impact from the outside of the container to the sealed container having tofu packed therein. Packed tofu is generally taken out of the container by stripping off the sealing cover and tapping the under side of the container held at a slant to slide tofu and to make a gap between the container and tofu. The method of the present invention is different from this manner in that an instantaneous impact of certain intensity is given to tofu sealed in the container from the outside thereby to cause some water content to separate and be present between tofu and the container.

The impact intensity is such that sliding occurs between tofu and the inner surface of the container. Such impact can be given by slapping the outside of the container or dropping the packed tofu from a given height.

The method of the present invention which uses a container having an aqueous solution containing magnesium salt and/or calcium salt applied to the inside thereof is then described. This method is the same as the above-described method, except that the aqueous ethanol solution is replaced with an aqueous solution of a magnesium salt and/or a calcium salt.

It is preferred for the soybean milk used in the method to have a protein concentration of 4.0 to 10% by weight, particularly 5.5 to 8.0% by weight.

The magnesium salt and/or calcium salt aqueous solution which is applied to the container is an aqueous solution containing at least one of natural bittern (nigari), magnesium chloride, magnesium sulfate, calcium chloride, calcium sulfate, calcium primary phosphate, calcium lactate, and the like. The total concentration of magnesium ions and calcium ions is preferably 1 ppm or higher, still preferably 10 to 300 ppm.

Natural water or sea water from a deep layer which contains 1 ppm or more of magnesium and/or calcium ions is also useful. The magnesium salt and/or calcium salt aqueous solution can be applied to the inside (the bottom and the sides) of the container in the same manner as for the aqueous ethanol solution.

The packed tofu thus prepared can be taken out of the container easily. The releasability of tofu from the container can further be improved by giving impact to the packed tofu as sealed from the outside of the container in the same manner as described above.

The method of producing packed tofu comprising dropping sealed packed tofu will then be described. According to the method, such a simple means as dropping makes packed tofu easily releasable from the container in its complete shape with no residue remaining in the container.

Packed tofu is dropped to break the tight contact between tofu and the inner side of the container by the impact thereby to improve tofu releasability from the container. If the dropping height is too large, the impact is so strong that tofu is destroyed, or the container is deformed, resulting in lost of commercial value. If the dropping height is too small, the impact is too weak to break the contact between tofu and the inner side of the container, failing to achieve the object of the invention. A suitable dropping height depends on the weight of the tofu package, the shape of the container, the material making the container, and the like. For example, a package of tofu weighing 50 to 500 g in a rectangular or cubic container of 50 to 150 mm wide, 50 to 150 mm long and 10 to 150 mm deep made of polypropylene, polyethylene or polystyrene is dropped from a height of about 10 to 100 cm whereby tofu can be taken out of the container while maintaining its complete shape without leaving any residue in the container.

Figure 16:
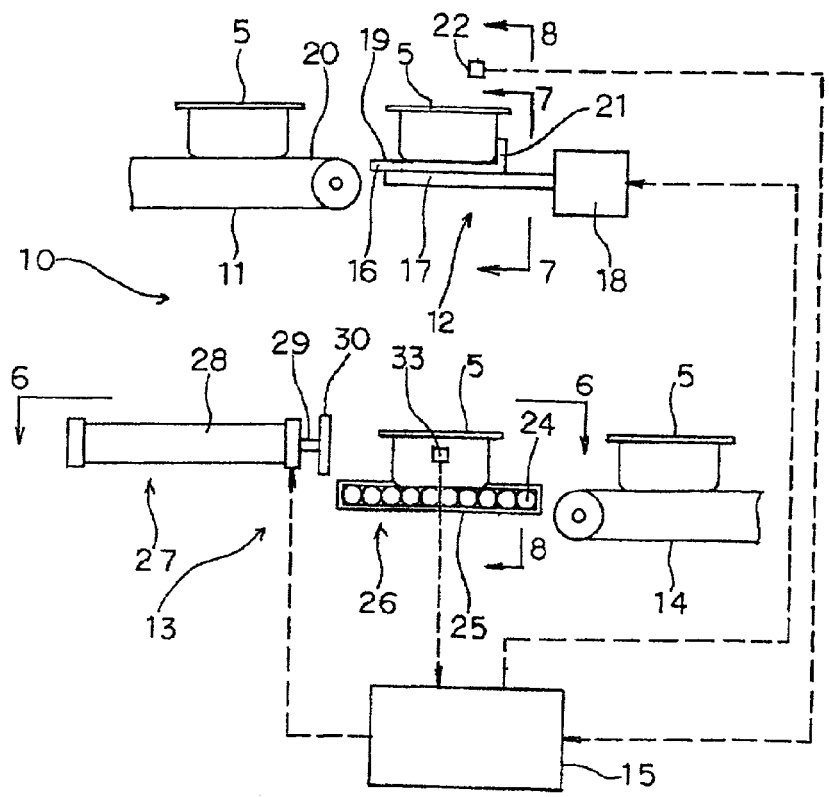
FIG. 16 is a front view of an example of a packed tofu dropping apparatus according to the present invention.
Figure 17:
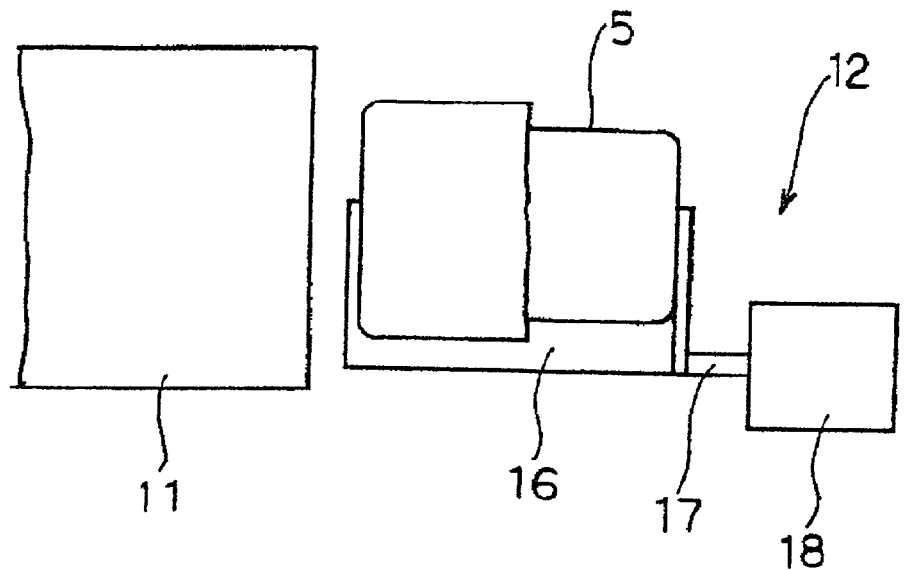
FIG. 17 is a plan view of the apparatus shown in FIG. 16.

The method will be explained by referring to the accompanying drawings. FIG. 16 is a front view of an example of the packed tofu dropping apparatus according to the present invention, and FIG. 17 is a plan view of the apparatus. The packed tofu dropping apparatus 10 shown in FIG. 16 is mainly composed of a loading conveyor 11 which introduces a package of packed tofu 5 into the system, a dropping section 12 which receives the packed tofu 5 from the conveyor 11 and drops it, a packed tofu receiving section 13 which receives the fallen package 5, an unloading conveyor 14 which sends the package 5 having improved releasability from the container 3 by dropping to the next step, and a controller 15 which controls the system.

The dropping section 12 is composed of a flat transfer plate 16 to which the packed tofu 5 is transferred, a rotating shaft 17 which is parallel with the traveling direction of the packed tofu 5 and is fixed to an edge of the transfer plate 16, for example, the lower side of the front side (in FIG. 16) end of the transfer plate 16, and a transfer plate driving unit 18 which connects to the rotating shaft 17 and rotates or swings the transfer plate 16. The transfer plate driving unit 18 includes an electric motor. The position (height) of the transfer plate 16 is such that its upper surface 19 is even with the upper surface 20 of the loading conveyor 11. The packed tofu 5 is carried on the loading conveyor 11 and transferred onto the transfer plate 16 by inertia force. The transfer plate 16 has an upright stopper 21 at the downstream end thereof across the traveling direction of the packed tofu 5, by which the packed tofu 5 is stopped on a given position of the plate 16.

Figure 19:
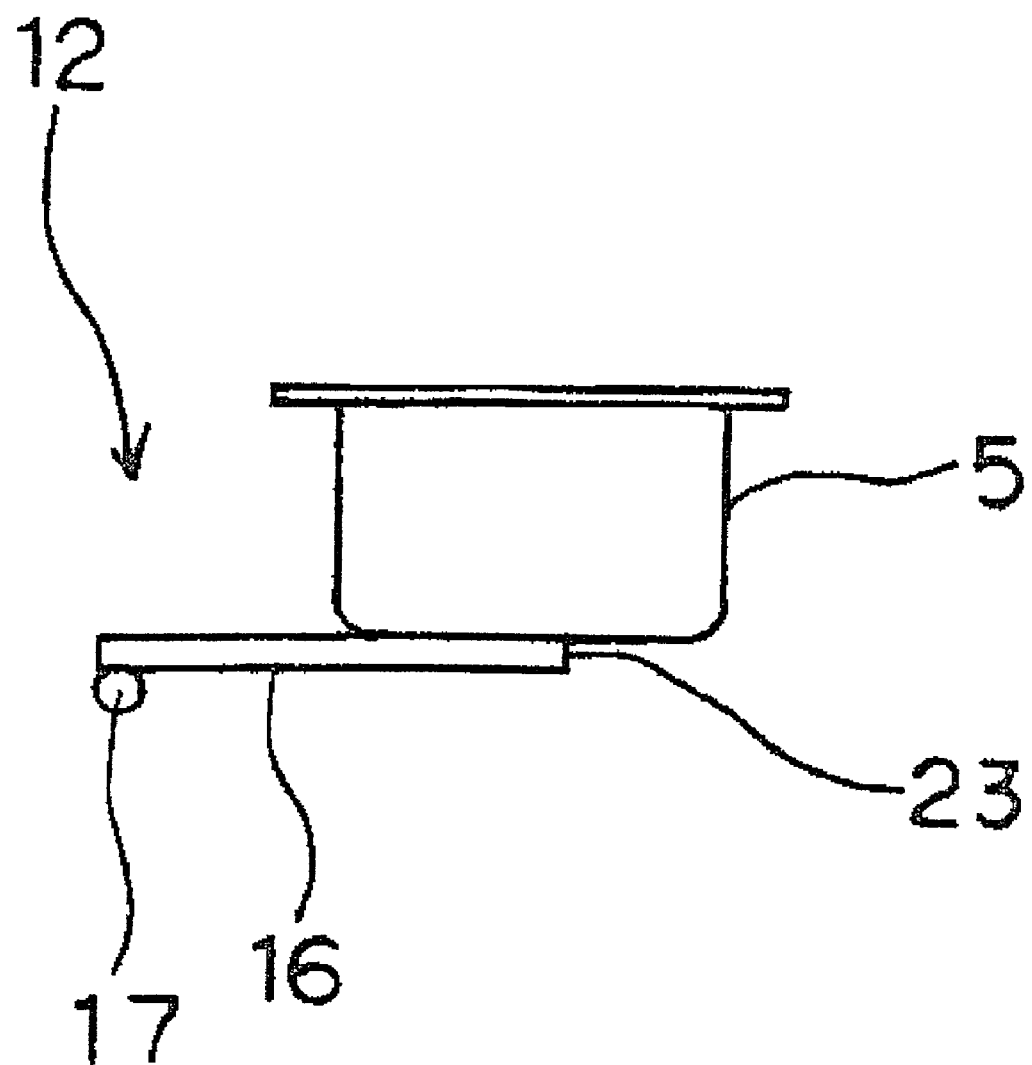
FIG. 19 is a view of the apparatus shown in FIG. 16 from plane 7—7.
Figure 20:
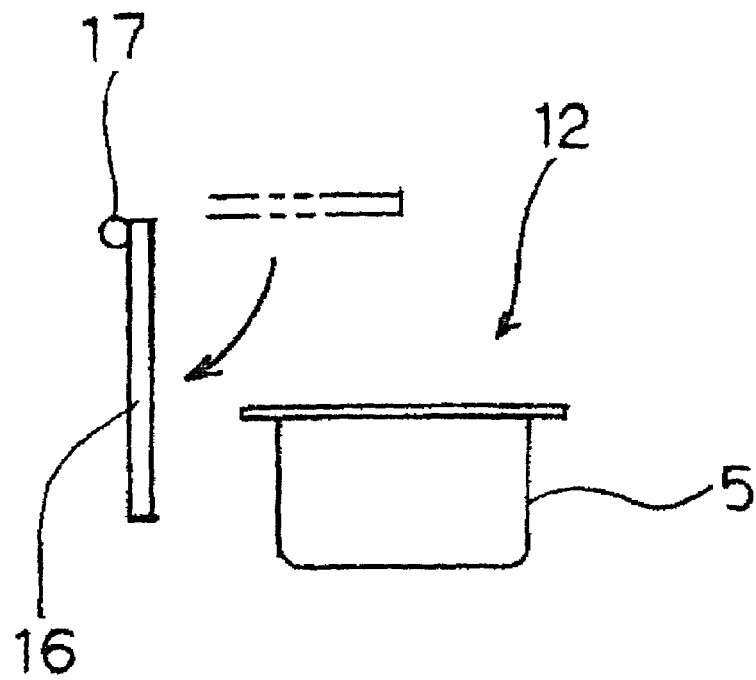
FIG. 20 is a view of the apparatus shown in FIG. 16 from plane 8—8, in which packed tofu is falling.
Figure 20:
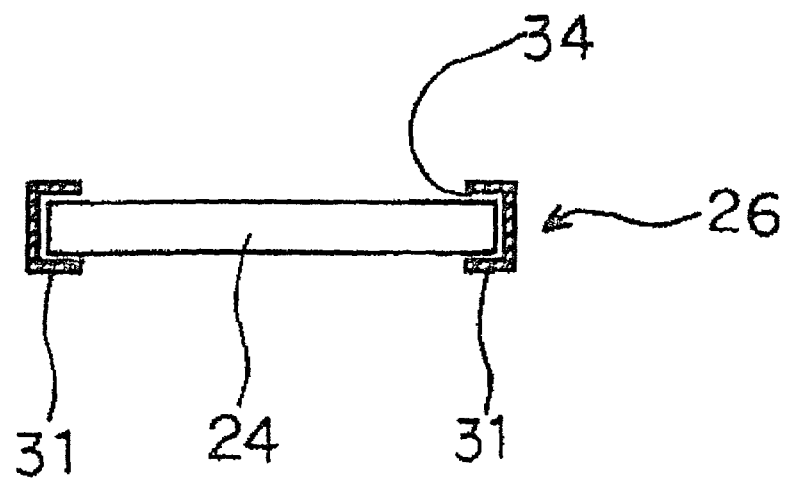
Figure 21:
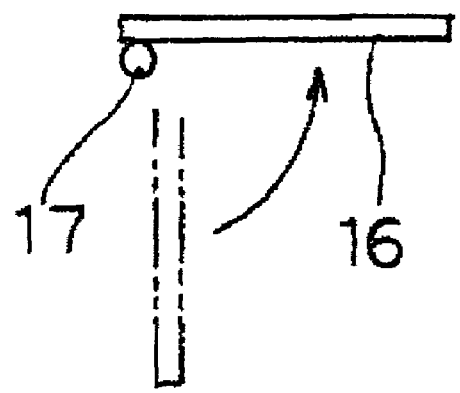
FIG. 21 is a view of the apparatus shown in FIG. 16 from plane 8—8, in which packed tofu has fallen on a receiving unit.
Figure 21:
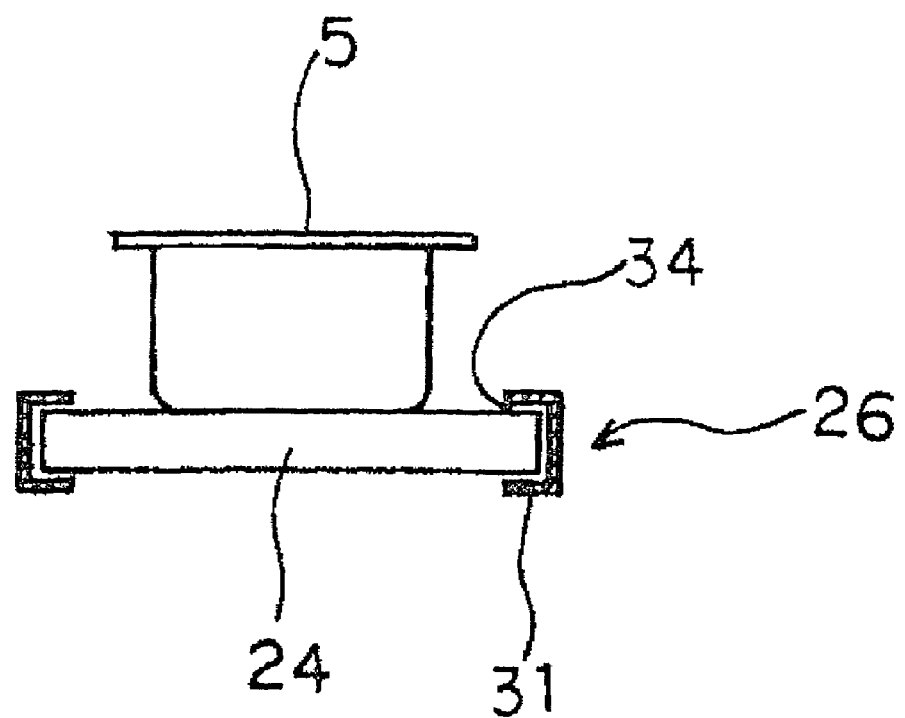

On transferring the packed tofu 5 to the transfer plate 16, a sensor 22 defects the packed tofu 5 transferred to the prescribed position and is set off to feed information to the controller 15, which sends instructions to the transfer plate driving unit 18. Upon receipt of the instructions, the driving unit 18 turns the rotating shaft 17 at 90° to make the transfer plate 16 vertical as shown in FIG. 20. The packed tofu 5 thus falls. Immediately thereafter, as shown in FIG. 21, the transfer plate 16 levels off to get ready to receive a next package of packed tofu 5 according to signals from the controller 15. Since packages of packed tofu 5 are carried on the loading conveyor 11 at certain intervals, the next package of packed tofu 5 is prevented from being transferred before the transfer plate 16 swings back to position by setting the moving speed of the loading conveyor 11 at a certain speed or slower.

Where the transfer plate 16 is a single plate as in the example shown in FIG. 16, the packed tofu 5 is placed thereon partly sticking out from the edge 23 of the transfer plate 16 as shown in FIG. 19. Such placement makes the packed tofu 5 fall while keeping level and land flat on its entire bottom of the container 3 on the receiving unit 13 as depicted in FIGS. 20 and 21. As a result, the impact force spreads uniformly through the packed tofu 5, and deformation of the container 3 can be prevented.

Figure 18:
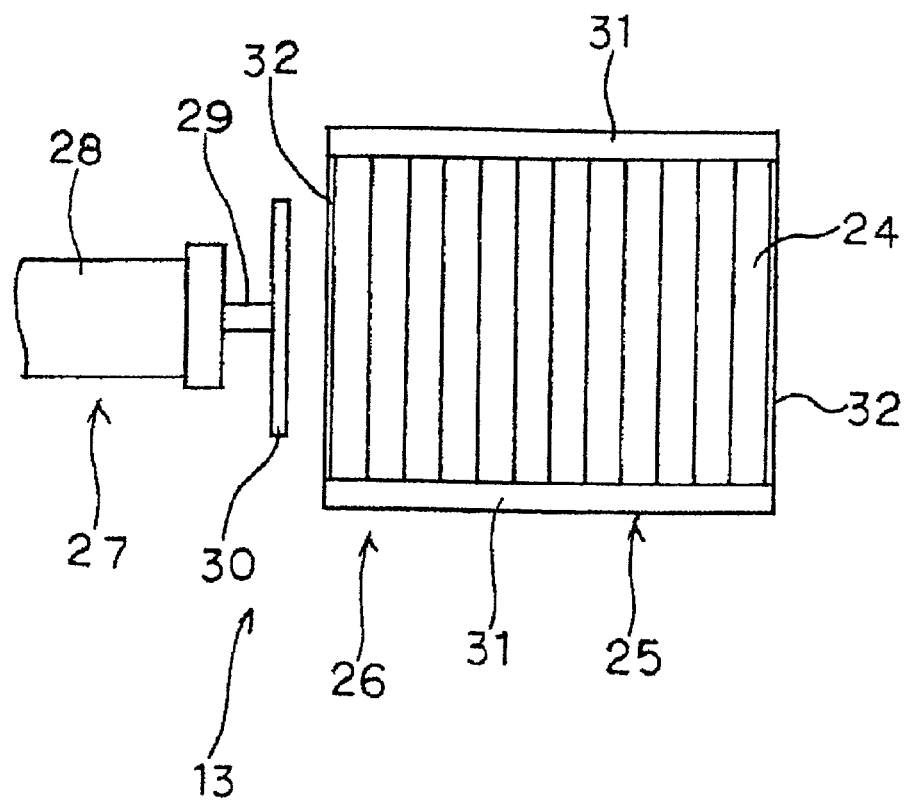
FIG. 18 is a view of the apparatus shown in FIG. 16 from plane 6—6.

The receiving section 13 is composed of a receiving unit 26 which receives the fallen packed tofu 5 and an unloading unit 27 which dislodges the packed tofu 5 from the receiving unit 26 to an unloading conveyor 14. The unloading unit 27 is composed of an air cylinder 28 and a push plate 30 fitted to the tip of the cylinder shaft 29. As shown in FIG. 18, the receiving unit 26 is made up of a number of pipes 24 and a frame 25 which holds the pipes 24. The frame 25 is composed of a pair of pipe holding members 31 each having a U-shaped cross-section, in which the ends of the pipes 24 are fitted, and connecting members 32 which connect the pair of pipe holding members 31. The packed tofu 5 falls on the pipes 24 of the receiving unit 26.

Figure 22:
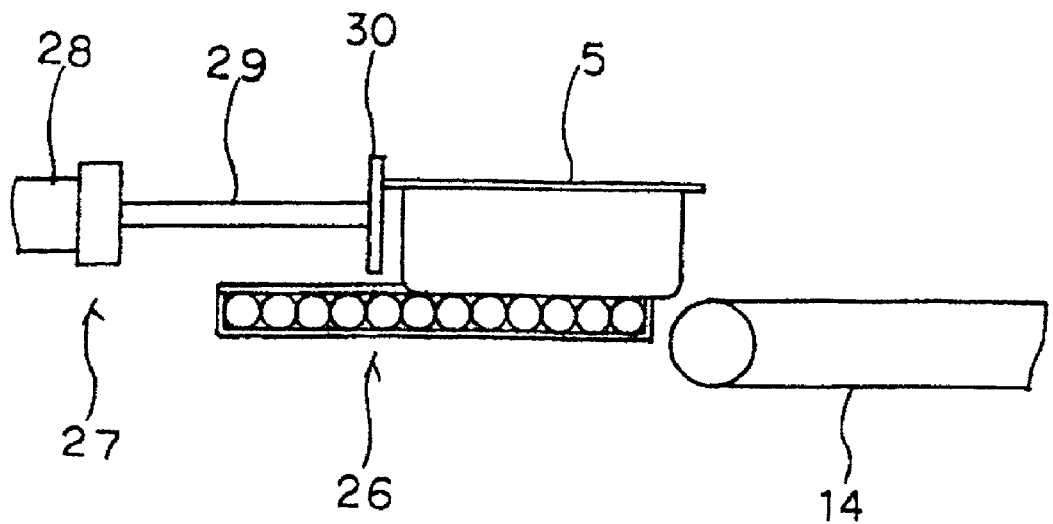
FIG. 22 shows packed tofu being unloaded from the receiving section.
Figure 23:
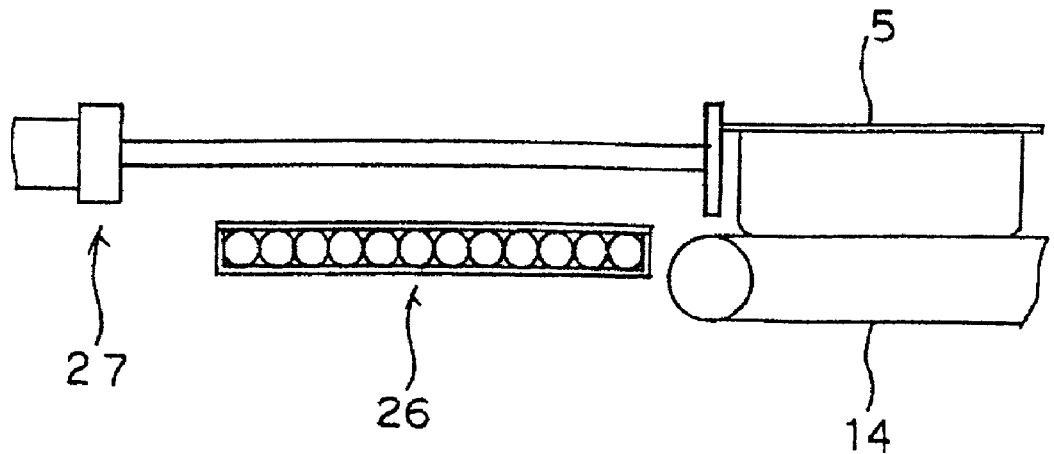
FIG. 23 shows packed tofu having been transferred onto an unloading conveyor from the receiving section.

The fallen packed tofu 5 on the pipes 24 of the receiving unit 26 is detected by a sensor 33. Signals from the sensor 33 are sent to the controller 15, and the controller 15 gives instructions to the unloading unit 27 to set off the air cylinder 28. The packed tofu 5 is pushed toward the unloading conveyor 14 and conveyed to the next step as shown in FIGS. 22 and 23. In the receiving section 13, since the packed tofu 5 is received by a plurality of pipes 24 as in the example shown, the impact of drop propagates throughout the packed tofu without concentrating on part of the container 3. It follows that the contact between tofu and the inner side of the container is efficiently severed without damaging the container. In this particular example, the above effect can be ensured by making a clearance 34 between the pipes 24 and the pipe holding members 31 as shown in FIGS. 20 and 21.

Figure 24:
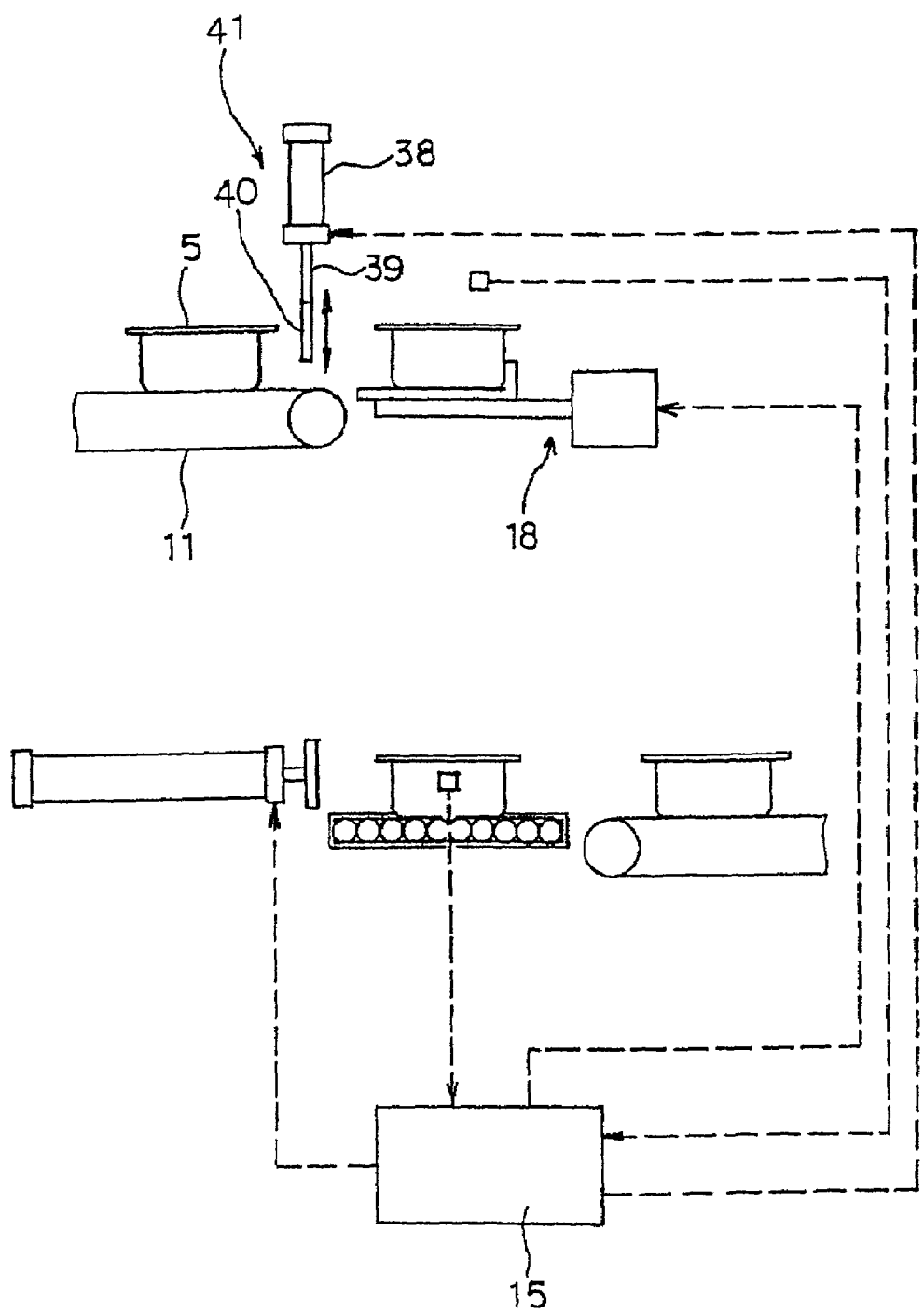
FIG. 24 shows another system for feeding packed tofu to the dropping apparatus.

FIG. 24 presents a modification of the packed tofu loading system, in which the system has a package stopping unit 41. The package stopping unit 41 is composed of an air cylinder 38 provided above the downstream end of the loading conveyor 11 and a stopper 40 provided at the tip of the cylinder shaft 39. The air cylinder 38 is controlled by the controller 15 synchronously with the transfer plate driving unit 18. The stopper 40 is in a lifted position to allow a package of packed tofu 5 to pass only when the transfer plate 16 is level so that the package 5 is prevented from falling directly without being once transferred to the dropping section 12.

Figure 25:
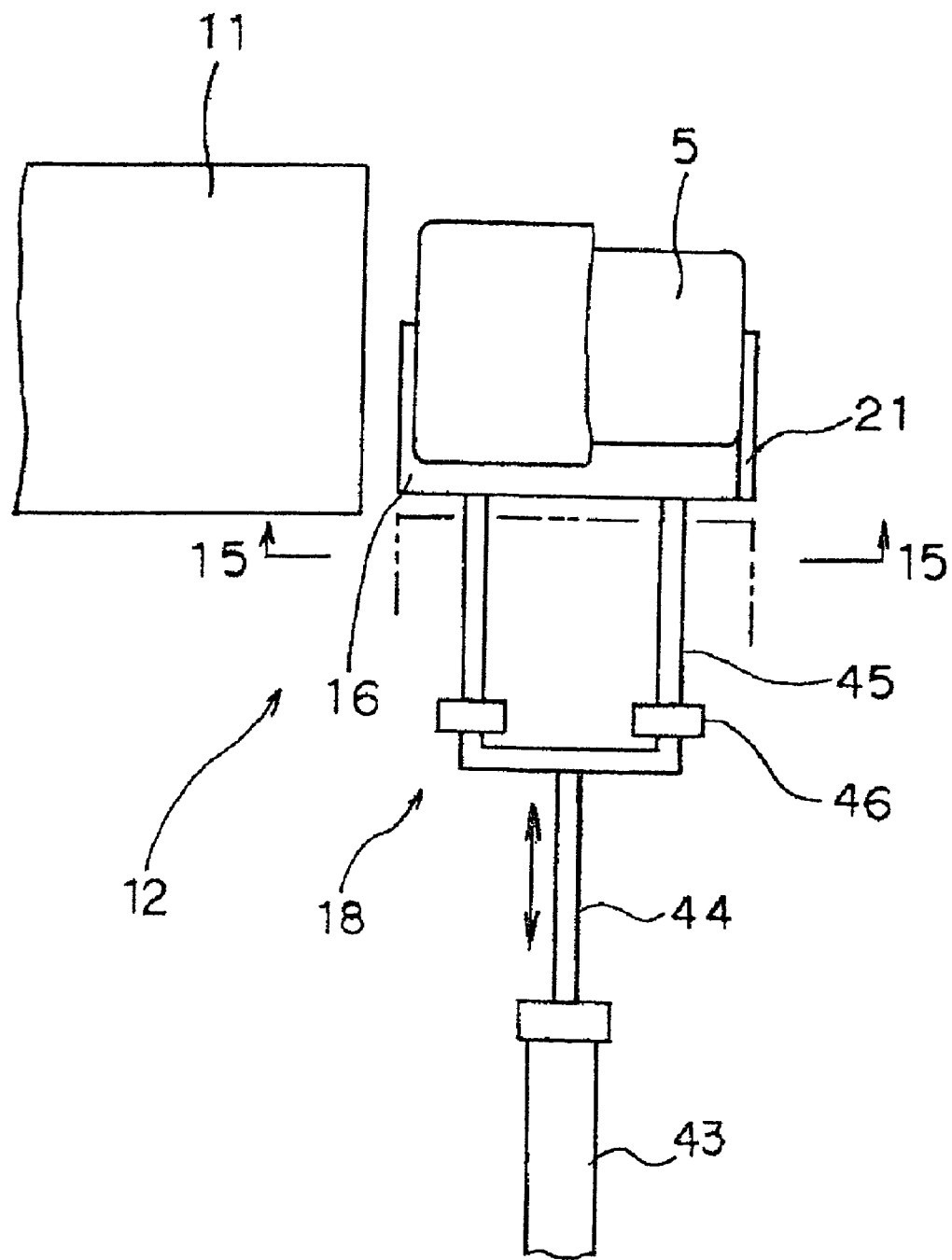
FIG. 25 is a plan view of a dropping section having another unit for driving a transfer plate.
Figure 26:
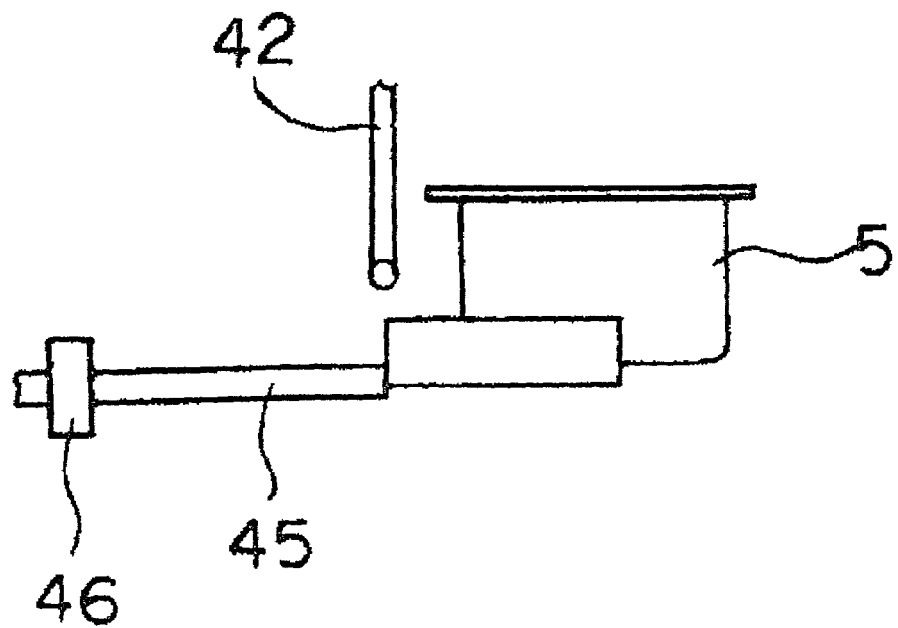
FIG. 26 is a left side view of the dropping section shown in FIG. 25.
Figure 27:
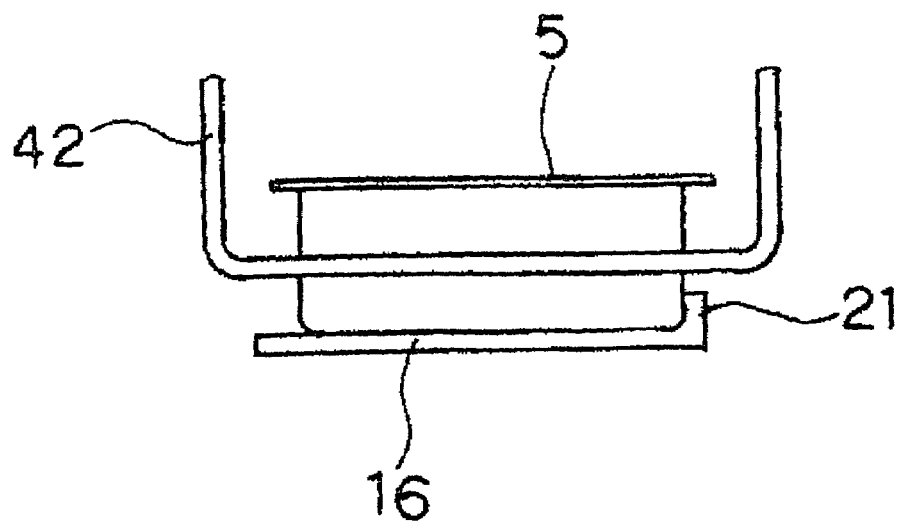
FIG. 27 is a view of the dropping section shown in FIG. 25 from plane 15—15.

A modification of the transfer plate driving unit 18 is shown in FIGS. 25 through 27. In this modification, the transfer plate 16 moves back and forth to let a package of packed tofu 5 on the transfer plate 16 fall. The dropping section 12 is composed of the transfer plate 16, the transfer plate driving unit 18, and a U-shaped stopping member 42 which is set above the left (in FIG. 26) edge of the transfer plate 16 in parallel with the moving direction of the packed tofu 5. The transfer plate driving unit 18 is composed of an air cylinder 43, a U-shaped connecting rod 45 provided at the tip of the cylinder shaft 44, and bearings 46 which bear the connecting rod 45 letting the rod 45 slide back and forth. The ends of the stopping member 42 are fixed to the sides of the transfer plate 16. The air cylinder 43 operates to move the transfer plate 16 back and forth. When the transfer plate 16 having packed tofu 5 thereon is moved backward, the packed tofu 5 strikes against the stopping member 42 and then falls.

Figure 28:
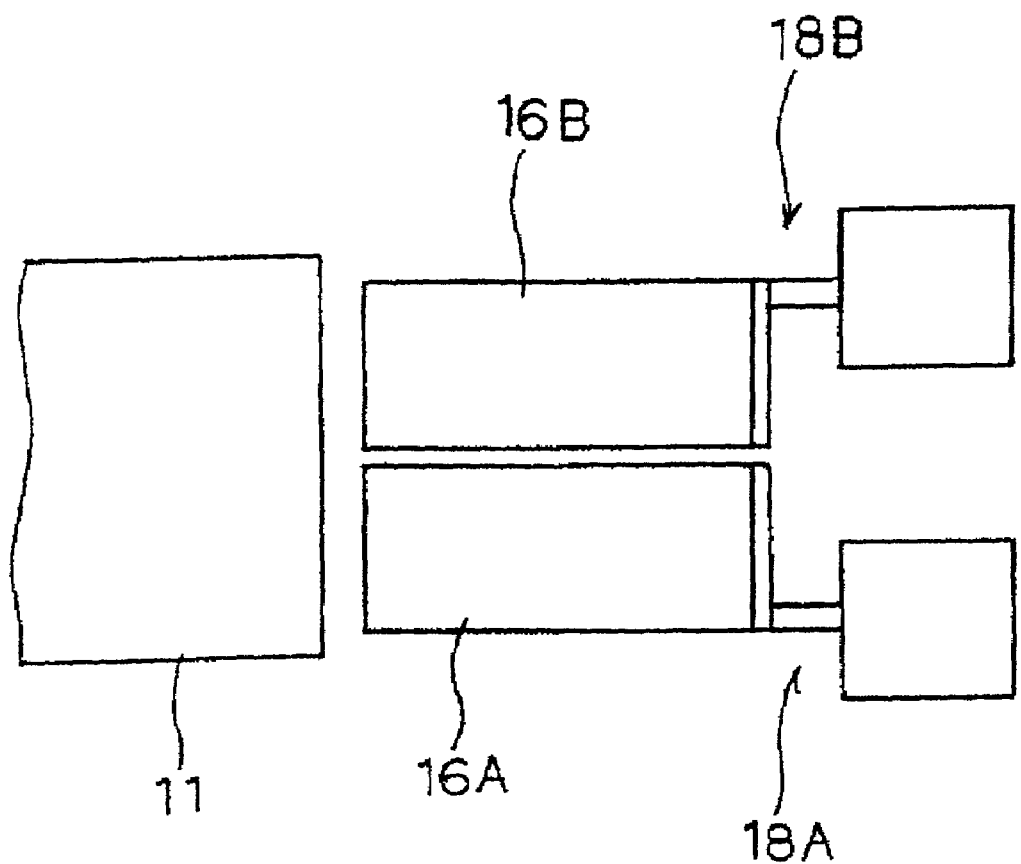
FIG. 28 illustrates still another unit for driving a transfer plate.

Another modification of the packed tofu dropping section is shown in FIG. 28. In this modification, the transfer plate 16 shown in FIG. 16 is made of a pair of plates 16A and 16B, which are driven by the respective driving units 18A and 18B. The driving units 18A and 18B operate synchronously to secure the level drop of packed tofu 5 as illustrated in FIG. 20.

Figure 29:
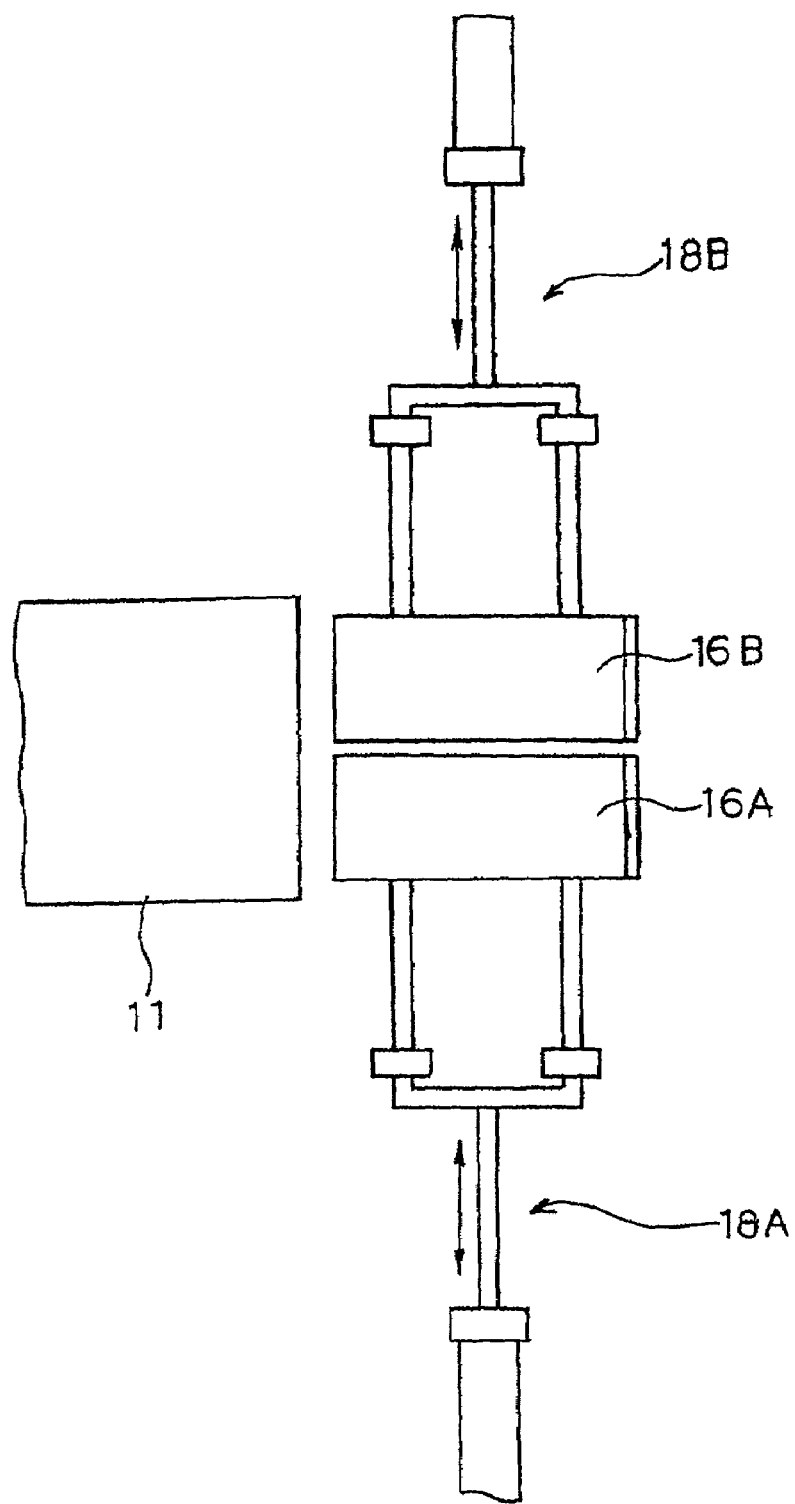
FIG. 29 shows yet another unit for driving a transfer plate.

Still another modification of the packed tofu dropping section is shown in FIG. 29, in which a pair of transfer plates 16A and 16B are driven by the respective driving units 18A and 18B in the way shown in FIG. 25. This modification has the same effect as obtained in the modification of FIG. 28.

Packed tofu which is treated with the above-described apparatus is prepared in a usual manner. A preferred process of making the packed tofu is briefly described below. Soybeans are soaked in water at 5 to 25° C. for 6 to 20 hours and drained. The soaked beans are ground in a grinder with 4 to 15 times their weight of water. The resulting slurry is heated at 80 to 130° C. for 0.1 to 10 minutes, followed by solid-liquid separation to obtain soybean milk. Solid-liquid separation is carried out in a usual manner, for example, by use of a screw decanter or a screw press, or by squeezing through cloth. Otherwise, soybeans or skinned soybeans can directly be ground in a grinder with 4 to 15 times their weight of water, and the slurry is processed in the same manner as described above. Still otherwise, skinned soybeans may be soaked in water or hot water for a short time, and ground, heated, and separated into solid and liquid (soybean milk) in the same manner as described above.

Figure 15:
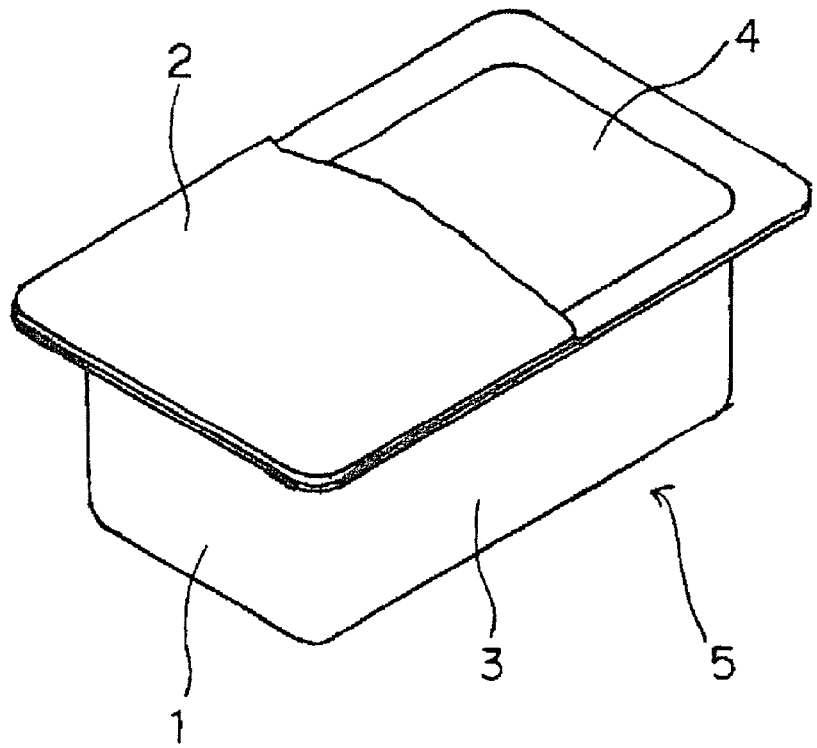
FIG. 15 is a perspective of an example of a package of packed tofu.

A coagulant is added to the resulting soybean milk in a usual manner. For example, a coagulant is uniformly dispersed in the soybean milk in a stirrer, e.g., a static mixer, and the soybean milk concentration is measured in terms of electric conductivity. The amount of the coagulant to be added is controlled in accordance with the measured value (a continuous addition mode). The soybean milk containing the coagulant is packed into containers, sealed, and heated at 70 to 100° C. for 30 to 60 minutes to obtain a package of packed tofu as shown in FIG. 15. Any commonly employed coagulant can be used with no particular limitation. For example, natural bittern (nigari), magnesium chloride or calcium chloride is used as an aqueous solution having a conventional concentration e.g., 20 to 80% by weight. Glucono-δ-lactone is also useful as a coagulant.

The present invention will now be illustrated in greater detail with reference to Experiments and Examples. Unless otherwise noted, all percents are by weight.

EXPERIMENT 1

Preparation of Packed Tofu

Whole soybeans (100 kg) were washed with water, soaked in water overnight, and ground in a horizontal grinder while adding 400 l of water. Immediately after grinding, the resulting slurry was heated while running in a discharge pipe by a heater provided around the discharge pipe at 105° C. for a retention time of 30 seconds. After cooling to 80° C., the solid matter was separated by means of a screw decanter. The resulting soybean milk was degassed in a vacuum container (degree of vacuum: 65 mm Hg), followed by cooling to 10° C.

To the cooled soybean milk were added magnesium chloride and calcium chloride in concentrations of 0.30% and 0.05%, respectively. The soybean milk containing the coagulant was packed into 77 mm wide, 129 mm long and 40 mm high polypropylene (PP) containers 1 to 10 whose inner side had been treated as described in Table 1 below and sealed with a PP-laminated nylon sheet. The containers were put in a hot water bath at 85° C. for 60 minutes to coagulate the soybean milk and cooled in water at 5° C. until the center temperature of tofu decreased to 10° C.

Experiment A

The packed tofu packages were kept in a refrigerator at 5° C. for 24 hours. The seal was stripped off, the under side of the container held at a slant was tapped, and the container was turned upside down on a flat plate. The tofu taken out of the container and the tofu remaining in the container were weighed, and the appearance of the tofu taken out of the container was observed.

Experiment B

The packed tofu packages were dropped from a height of 40 cm with their sealed side up. The seal was stripped off, and tofu was taken out of the container in the same manner as in Experiment A and measured and observed in the same manner as in Experiment A.

Figure 2:
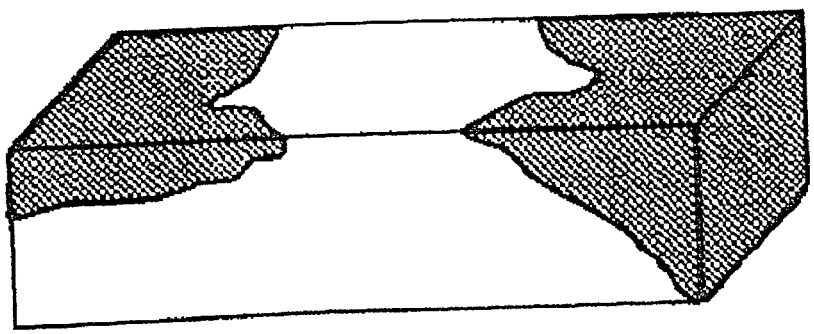
FIG. 2 shows tofu taken out of container 1 used in Experiment B, in which the gray zone is the portion remaining in the container.
Figure 3:
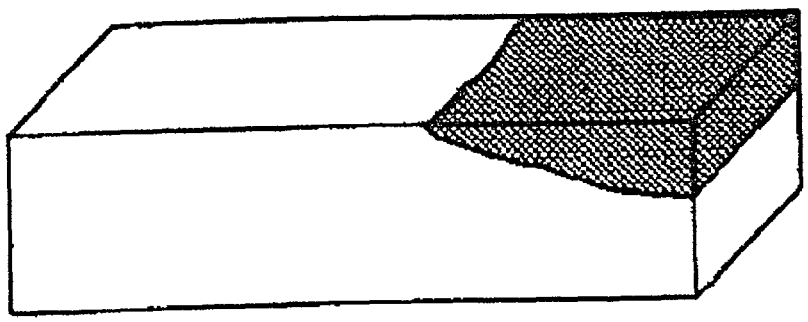
FIG. 3 shows tofu taken out of container 2 used in Experiment B, in which the gray zone is the portion remaining in the container.
Figure 4:
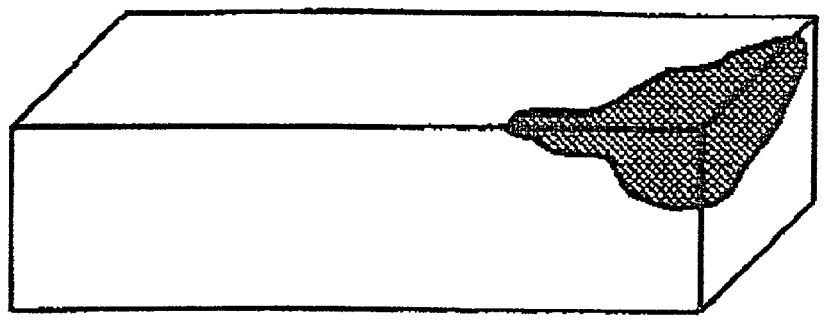
FIG. 4 shows tofu taken out of container 3 used in Experiment B, in which the gray zone is the portion remaining in the container.
Figure 5:
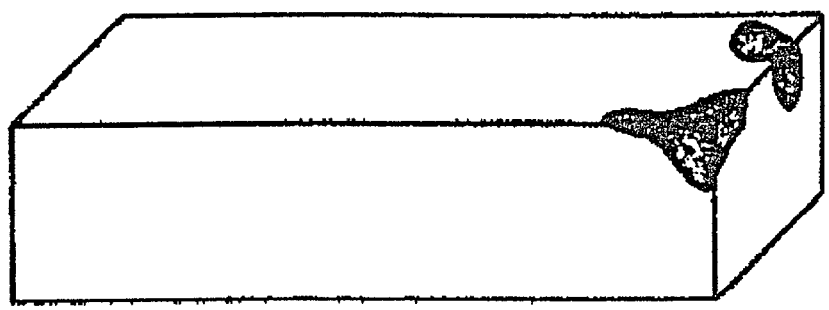
FIG. 5 shows tofu taken out of container 4 used in Experiment A, in which the gray zone is the portion remaining in the container.
Figure 6:
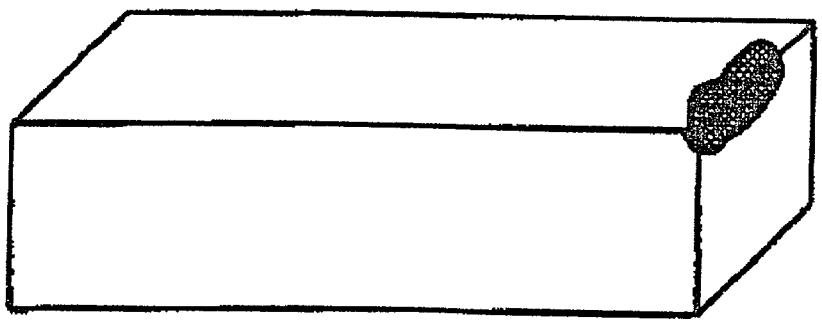
FIG. 6 shows tofu taken out of container 5 used in Experiment A and container 4 in Experiment B, in which the gray zone is the portion remaining in the container.
Figure 7:
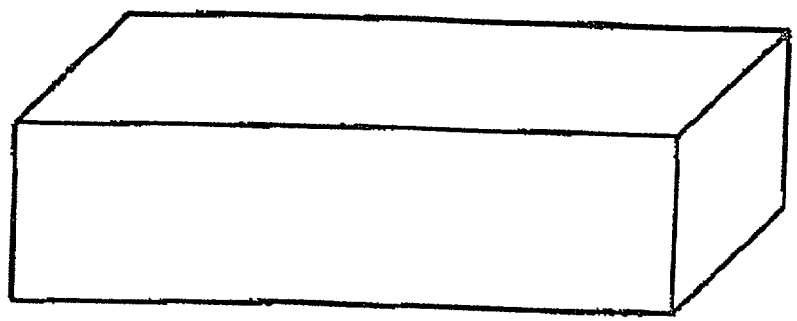
FIG. 7 shows tofu taken out of containers 6 to 10 used in Experiment A and containers 5 to 10 in Experiment B.

Experiments A and B were carried out on 5 packages of a kind. An average weight of packed tofu was 351.5 g. Typical shapes of tofu taken out of the container are shown in FIGS. 1 through 7, in which the gray zone is the portion remaining in the container. FIGS. 1 to 3 show cases where tofu remained in the container to an unacceptable degree as a commercial product. FIG. 4 also represents an unacceptable state as a commercial product. The states shown in FIGS. 5 and 6 are limits acceptable as merchandise. FIG. 7 is the complete shape of tofu as taken out of the container.

The results of Experiments A and B are shown in Tables 2 and 3. An average state of the five blocks of tofu taken out of the containers is shown in the Tables. The weight of tofu, either taken out of and remaining in the container, was an average of the five packages.

TABLE 1

| Container No. | Treatment of Inside of Container |
|---|---|
| 1 | none (control 1) |
| 2 | spraying with ion-exchanged water (control 2) |
| 3 | spraying with 0.1% aqueous ethanol solution |
| 4 | spraying with 0.5% aqueous ethanol solution |
| 5 | spraying with 1.0% aqueous ethanol solution |
| 6 | spraying with 5.0% aqueous ethanol solution |
| 7 | spraying with 10.0% aqueous ethanol solution |
| 8 | spraying with 20.0% aqueous ethanol solution |
| 9 | spraying with 30.0% aqueous ethanol solution |
| 10 | spraying with 50.0% aqueous ethanol solution |

TABLE 2

| | Experiment A | | |
|---|---|---|---|
| Container No. | State of Tofu Taken out of Container | Weight of Tofu Taken out of Container (g) | Weight of Tofu Remaining in Container (g) |
| 1 | FIG. 1 | 74.7 | 276.7 |
| 2 | FIG. 1 | 137.5 | 213.8 |
| 3 | FIG. 1 | 132.8 | 218.4 |
| 4 | FIG. 5 | 346.1 | 4.9 |
| 5 | FIG. 6 | 348.5 | 3.0 |
| 6 | FIG. 7 | 350.5 | 0.8 |
| 7 | FIG. 7 | 352.1 | 0 |
| 8 | FIG. 7 | 351.5 | 0 |
| 9 | FIG. 7 | 351.8 | 0 |
| 10 | FIG. 7 | 351.1 | 0 |

TABLE 3

Experiment B

| Container No. | State of Tofu Taken out of Container | Weight of Tofu Taken out of Container (g) | Weight of Tofu Remaining in Container (g) |
|---|---|---|---|
| 1 | FIG. 2 | 281.3 | 69.5 |
| 2 | FIG. 3 | 333.0 | 18.0 |
| 3 | FIG. 4 | 348.2 | 9.4 |
| 4 | FIG. 6 | 348.5 | 2.8 |
| 5 | FIG. 7 | 352.1 | 0 |
| 6 | FIG. 7 | 351.7 | 0 |
| 7 | FIG. 7 | 351.3 | 0 |
| 8 | FIG. 7 | 351.6 | 0 |
| 9 | FIG. 7 | 351.0 | 0 |
| 10 | FIG. 7 | 351.9 | 0 |

EXAMPLE 1

Whole soybeans weighing 100 kg were washed with water, soaked in water overnight, and ground in a horizontal grinder while pouring 400 l of water. Immediately after grinding the slurry was heated by a heater provided around the discharge pipe of the grinder at 115° C. for a retention time of 30 seconds. After cooling to 85° C., the solid matter was separated by means of a screw decanter. The resulting soybean milk was degassed in a vacuum container (degree of vacuum: 550 mm Hg), sterilized by direct heating at 150° C. for 3 seconds and cooled to 10° C. To the cooled soybean milk were added magnesium chloride and calcium chloride in concentrations of 0.25% and 0.08%, respectively. The soybean milk containing the coagulant was packed into 77 mm wide, 129 mm long and 40 mm high PP containers whose inner side had been sprayed with a 30% aqueous ethanol solution and sealed with a PP-laminated nylon sheet (hereinafter referred to as NY/PP sheet). The sealed containers were put in a hot water bath at 85° C. for 60 minutes to coagulate the soybean milk and then cooled with tap water to 40° C. and then in a refrigerator to a center temperature of 10° C. The seal was stripped off, the under side of the container held at a slant was tapped, and the container was turned upside down on a plate. The tofu was smoothly released from the container in its complete shape. No residue remained in the

EXAMPLE 2

Packed tofu was produced in the same manner as in Example 1, except that the inside of the containers had been sprayed with a 3% aqueous ethanol solution. The package of packed tofu held at a slant was slapped twice each on the four sides and the bottom of the container to give impact. The seal was stripped off, the under side of the container held at slant was tapped, and the container was turned upside down on a plate. Tofu could be smoothly taken out of the container with no flaws, and no residue remained in the container.

EXPERIMENT 2

Preparation of Packed Tofu

Coagulant-containing soybean milk was prepared in the same manner as in Experiment 1.

Magnesium chloride and/or calcium chloride were dissolved in ion-exchanged water in a concentration(s) shown in Table 4 below, and the resulting aqueous solution was uniformly sprayed to the inside of 77 mm wide, 129 mm long and 40 mm high PP containers. The containers 1 to 11 were filled with the coagulant-containing soybean milk and sealed with an NY/PP sheet. The soybean milk was coagulated in hot water at 85° C. for 60 minutes and cooled in water at 5° C. to a center temperature of 10° C. to obtain packages of packed tofu (Experiment C). Container 1 is a non-treated container, and container 2 is a container sprayed with ion-exchange water. The packages as sealed were slapped twice each on the four sides and the bottom (Experiment D).

After refrigerating the packages at 5° C. for 24 hours, the seal was stripped off, a side of the container held at a slant was tapped to make a gap between the packed tofu and the side of the container, and the container was turned upside down on a flat plate. The state of the tofu release from the container was observed, and the weight of tofu, either taken out and remaining in the container, was measured. The results obtained are shown in Tables 5 and 6.

TABLE 4

| | Spraying Aqueous Solution | |
|---|---|---|
| Container No. | Mg Ion Concn. (ppm) | Ca Ion Concn. (ppm) |
| 1 | untreated | untreated |
| 2 | 0 | 0 |
| 3 | 0.1 | 0 |
| 4 | 0 | 0.1 |
| 5 | 0.1 | 0.1 |
| 6 | 1.0 | 0 |
| 7 | 0 | 1.0 |
| 8 | 1.0 | 1.0 |
| 9 | 10 | 0 |
| 10 | 0 | 10 |
| 11 | 10 | 10 |

TABLE 5

Experiment C

Figure 8:
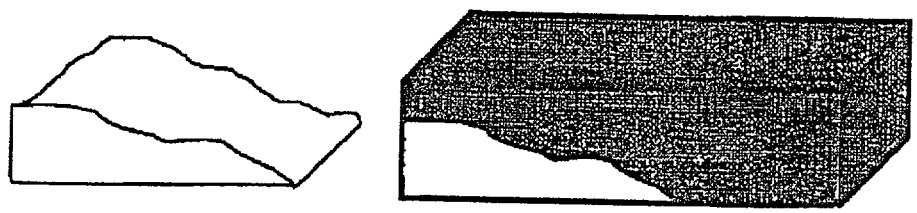
FIG. 8 shows tofu taken out of containers 1 and 2 used in Experiment C, in which the gray zone is the portion remaining in the container.
Figure 9:
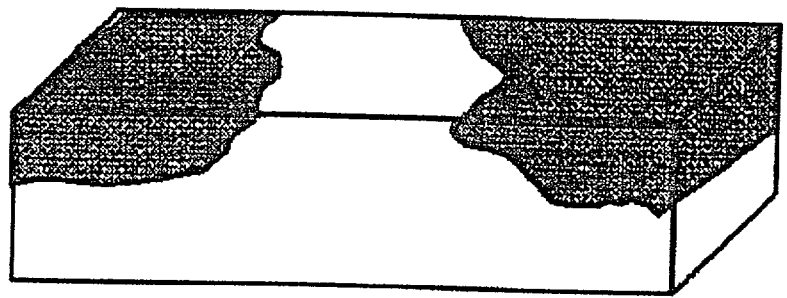
FIG. 9 shows tofu taken out of containers 3 and 4 used in Experiment C and container 1 in Experiment D, in which the gray zone indicates the portion remaining in the container.
Figure 10:
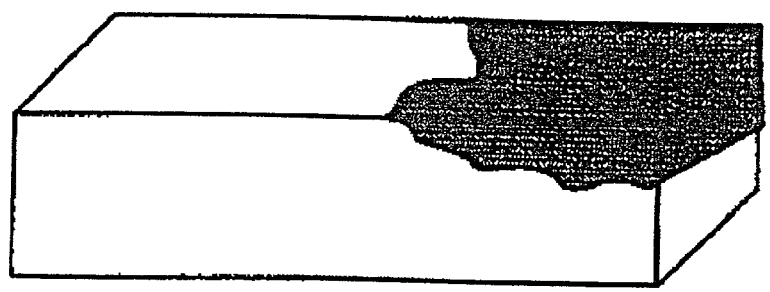
FIG. 10 shows tofu taken out of container 5 used in Experiment C and container 2 used in Experiment D, in which the gray zone indicates the portion remaining in the container.
Figure 13:
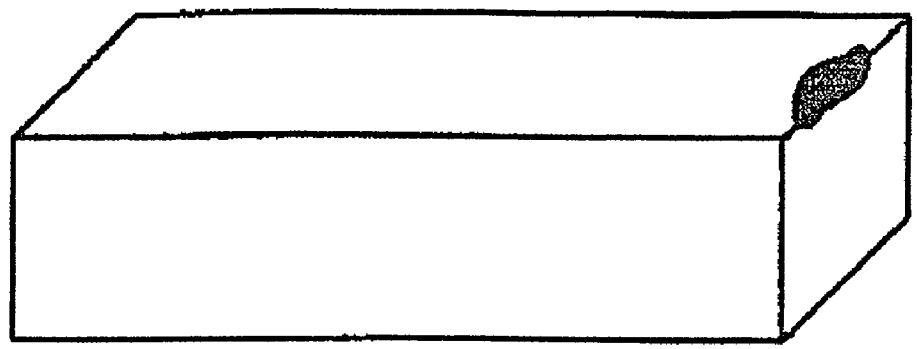
FIG. 13 shows tofu taken out of containers 6 and 7 used in Experiment C, in which the gray zone indicates the portion remaining in the container.
Figure 14:
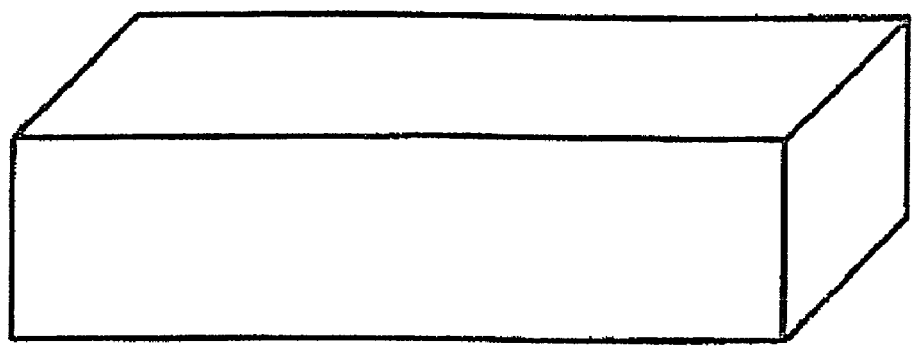
FIG. 14 shows tofu taken out of containers 8 to 11 used in Experiment C and containers 6 to 11 used in Experiment D, in which the gray zone indicates the portion remaining in the container.

| Container No. | State of Tofu Taken out of Container | Weight of Tofu Taken out of Container (g) | Weight of Tofu Remaining in Container (g) |
|---|---|---|---|
| 1 | FIG. 8 | 66.9 | 285.3 |
| 2 | FIG. 8 | 131.2 | 220.6 |
| 3 | FIG. 9 | 246.8 | 104.7 |
| 4 | FIG. 9 | 260.6 | 91.5 |
| 5 | FIG. 10 | 312.3 | 39.1 |
| 6 | FIG. 13 | 351.5 | 0.4 |
| 7 | FIG. 13 | 352.0 | 0.1 |
| 8 | FIG. 14 | 352.3 | 0 |
| 9 | FIG. 14 | 352.1 | 0 |
| 10 | FIG. 14 | 352.4 | 0 |
| 11 | FIG. 14 | 351.9 | 0 |

TABLE 6

Experiment D

Figure 11:
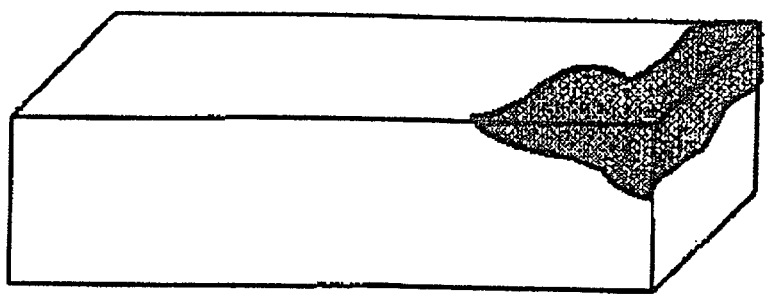
FIG. 11 shows tofu taken out of containers 3 and 4 used in Experiment D, in which the gray zone is the portion remaining in the container.
Figure 12:
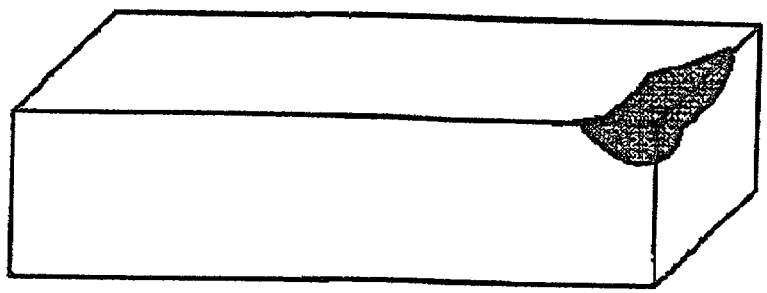
FIG. 12 shows tofu taken out of container 5 used in Experiment D, in which the gray zone is the portion remaining in the container.

| Container No. | State of Tofu Taken out of Container | Weight of Tofu Taken out of Container (g) | Weight of Tofu Remaining in Container (g) |
|---|---|---|---|
| 1 | FIG. 9 | 279.8 | 71.9 |
| 2 | FIG. 10 | 327.1 | 25.2 |
| 3 | FIG. 11 | 337.4 | 14.6 |
| 4 | FIG. 11 | 343.4 | 9.1 |
| 5 | FIG. 12 | 349.9 | 2.5 |

TABLE 6-continued

Experiment D

| Container No. | State of Tofu Taken out of Container | Weight of Tofu Taken out of Container (g) | Weight of Tofu Remaining in Container (g) |
|---|---|---|---|
| 6 | FIG. 14 | 352.0 | 0 |
| 7 | FIG. 14 | 351.6 | 0 |
| 8 | FIG. 14 | 352.3 | 0 |
| 9 | FIG. 14 | 351.5 | 0 |
| 10 | FIG. 14 | 351.3 | 0 |
| 11 | FIG. 14 | 352.2 | 0 |

EXAMPLE 3

Whole soybean weighing 100 kg were washed with water, soaked in water overnight, and ground in a horizontal grinder while pouring 400 l of water. Immediately after grinding, the slurry was heated by a heater provided around the discharge pipe of the grinder at 115° C. for a retention time of 30 seconds. After cooling to 85° C., the solid matter was separated by means of a screw decanter. The resulting soybean milk was degassed in a vacuum container (degree of vacuum: 600 mm Hg), sterilized by direct heating at 150° C. for 3 seconds and cooled to 10° C. To the cooled soybean milk were added magnesium chloride and calcium chloride in concentrations of 0.25% and 0.10%, respectively. The soybean milk containing the coagulant was packed into 77 mm wide, 129 mm long and 40 mm high PP containers whose inner side had been sprayed with a 0.1% aqueous solution of magnesium chloride (Mg ion concentration: 120 ppm) and sealed with an NY/PP sheet. The packages were put in a hot water bath at 85° C. for 60 minutes to coagulate the soybean milk and then cooled with tap water to 40° C. and then in a refrigerator to a center temperature of 10° C. The seal was stripped off, a side of the container held at a slant was tapped to make a gap between tofu and the side of the container, and the container was turned upside down on a plate. The tofu was smoothly released from the container in its complete shape with no damages on its surface.

EXAMPLE 4

Packed tofu was prepared in the same manner as in Example 3, except for replacing the 0.1% aqueous magnesium chloride solution (Mg ion concentration: 120 ppm) with commercially available natural drinking water (available from company A; Ca ion concentration: 78 ppm; Mg ion concentration: 24 ppm). When tofu was taken out of the container in the same manner as in Example 3, it showed smooth release from the container without suffering damage on its surface.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

This application claims the priority of Japanese Patent Application Nos. 2000-394416 filed Dec. 26, 2000 and 2001-77555 filed Mar. 19, 2001, which are incorporated herein by reference.

What is claimed is:

1. A method of producing packed tofu comprising the sequential steps of:
    applying an aqueous ethanol solution or an aqueous solution containing at least one of a magnesium salt and a calcium salt to the inside surface of an empty container to coat the entire inside surface of the empty container,
    filling the thus-coated empty container with soybean milk containing a coagulant,
    sealing the container, and
    heating the sealed container to coagulate the soybean milk.

2. The method according to claim 1, wherein said aqueous ethanol solution has a concentration of 0.5% by weight or higher.

3. The method according to claim 1, wherein said aqueous solution is water containing a total concentration of at least 1 ppm of magnesium ions or calcium ions or both.

4. The method according to claim 1, wherein said aqueous solution is sea water.

5. The method according to claim 1, which further comprises, intentionally as a manufacturing step, giving impact from the outside of the container to the sealed container having tofu packed therein after the heat coagulation step.

6. The method according to claim 5, wherein said impact is slapping the container or dropping the container sufficient to break a contact between contained tofu and the inside surface of the container.

7. The method according to claim 5, wherein said impact is by slapping the outside of the container with sufficient force to make a gap between the container inside surface and contained tofu and to cause some water to separate and be present between the tofu and the container.

8. The method of claim 1, wherein the aqueous solution is an aqueous ethanol solution.

9. The method of claim 1, wherein, the step of applying an aqueous ethanol solution or an aqueous solution to the inside surface of the empty container coats the entire inside surface of the empty container.

10. The method of claim 1, wherein, the step of applying an aqueous ethanol solution or an aqueous solution to the inside surface of the empty container coats substantially the entire inside surface of the empty container.

11. The method of claim 1, wherein the solution is applied to the inside surface of the empty container by swabbing with a cloth impregnated with the solution.

12. The method of claim 1, wherein the solution is applied to the inside surface of the empty container by spraying the solution onto the inside surface of the container.

13. The method of claim 1, wherein the solution is applied thinly and uniformly to the inside surface of the empty container.

14. The method of claim 1, wherein the solution is applied 1.0 to 50% by weight ethanol concentration.

15. A method of producing packed tofu which comprises the sequential steps of:
    filling a container with soybean milk containing a coagulant,
    sealing the container,
    heating the sealed container to coagulate the soybean milk, and
    as part of the manufacturing process, intentionally dropping the container from a height sufficient to break a contact between contained tofu and an inside surface of the container,
    wherein prior to said filling step, there is a step of applying an aqueous solution comprising at least one of a magnesium salt and a calcium salt to an interior surface of the container.

* * * * *